United States Patent

Breitenbach et al.

[11] Patent Number: 4,785,138
[45] Date of Patent: Nov. 15, 1988

[54] ELECTRIC CABLE FOR USE AS PHASE WINDING FOR LINEAR MOTORS

[75] Inventors: Otto Breitenbach, Nuremburg; Ferdinand Hanisch, Burgwedel; Peter Madry, Barsinghausen, all of Fed. Rep. of Germany

[73] Assignee: Kabel Electro Gesellschaft mit beschränkter Haftung, Hanover, Fed. Rep. of Germany

[21] Appl. No.: 926,377

[22] Filed: Oct. 31, 1986

[30] Foreign Application Priority Data

Dec. 6, 1985 [DE] Fed. Rep. of Germany ....... 3543106

[51] Int. Cl.⁴ .............................................. H01B 7/18
[52] U.S. Cl. ................................ 174/106 SC; 156/51; 174/105 SC; 174/113 A; 174/119 R
[58] Field of Search ................... 174/102 SC, 105 SC, 174/106 SC, 113 A, 119 R, 128 R; 156/51

[56] References Cited

U.S. PATENT DOCUMENTS

| | | | |
|---|---|---|---|
| 3,335,260 | 8/1967 | Ferschl | 219/155 |
| 3,413,167 | 11/1968 | Trill | 156/51 |
| 3,479,446 | 11/1969 | Arnaudin, Jr. et al. | 156/51 X |
| 3,878,319 | 4/1975 | Wahl | 174/106 SC |
| 4,109,098 | 4/1978 | Olsson et al. | 174/106 SC |
| 4,125,741 | 11/1978 | Wahl et al. | 174/113 A X |
| 4,360,748 | 11/1982 | Raschbichler et al. | 310/13 |
| 4,469,539 | 9/1984 | Wade et al. | 174/105 SC X |
| 4,529,175 | 7/1985 | Kyriakis | 219/155 X |

FOREIGN PATENT DOCUMENTS 3006382 10/1985 Fed. Rep. of Germany .
1370122 10/1974 United Kingdom ......... 174/102 SC Primary Examiner—Morris H. Nimmo
Attorney, Agent, or Firm—Martin A. Farber

[57] ABSTRACT

An electric cable to be used as phase winding of a three-phase alternating current winding for linear motors. The cable has a compacted, soft-annealed stranded conductor (5) on which a conductive layer (7) is firmly anchored. The insulation (8) and the outer conductive layer (9) are applied in the same operation as the extruded inner conductive layer (7) and are firmly attached to the latter. A sheathing (10) which is of good electrical conductivity and mechanically stable is applied over the outer conductive layer (9).

6 Claims, 1 Drawing Sheet

ELECTRIC CABLE FOR USE AS PHASE WINDING FOR LINEAR MOTORS

FIELD AND BACKGROUND OF THE INVENTION

The invention refers to an electric cable for use as phase winding in a three-phase alternating-current winding for linear motors in which the phase windings are fixed in meander-like course in the grooves of an elongated conductor, the cable having a metallic conductor, an inner conductive layer surrounding the conductor, an insulation disposed over said conductive layer, an outer conductive layer surrounding said insulation and a sheathing of electrically conductive material placed over this.

Such a cable can be noted from Federal Republic of Germany Pat. No. 30 06 382. Said cable is formed in three strands into a prefabricated winding of a linear motor, which winding can be wound as a unitary structure on a reel, transported to the place of installation and inserted there in particularly simple manner into the grooves of the inductor of the linear motor. The cable must be capable of being readily worked into a winding and in its worked condition retain its electrical and mechanical properties for a long time in order to produce a traveling magnetic field. This includes, for instance, a tight, firm seat of the inner conductive layer on the conductor, a high conductance and high current-carring capacity of the shield which is formed by the outer conductive layer and the conductive sheathing. The conductance and the load-carrying capacity of the shield must be such that, on the one hand, charge currents do not substantially increase the shield potential and in the event of a grounding fault, the current necessary to detect the grounding can flow and that, on the other hand, there are only negligible losses by secondary currents which flow in the conductor loops of the intersecting cable strands and a ground strand as a result of the induced voltages. One attempt to meet these goals is taught in the construction of a cable in accordance with Federal Republic of Germany Pat. No. 30 06 382. However, no indication as to how the requirements are to be satisfied can be noted from that patent.

SUMMARY OF THE INVENTION

It is an object of the invention to provide an electric cable which both electrically and mechanically satisfies all requirements which are made on a phase winding of a linear motor.

Accordingly, the invention provides that, in a cable of the above-mentioned type, the conductor is developed as stranded conductor (5) having at least two layers of individual wires (6) and is soft-annealed after the stranding;

an inner conductive layer (7) applied by extrusion on the stranded conductor and fills up the outer spaces between the individual wires (6) of the outer layer of the stranded conductor (5), and is firmly attached to the insulation (8);

an outer conductive layer (9) consists of a highly conductive flexible material which is firmly attached to the insulation (8); and a sheathing (10) is of high electric conductivity and consists of a material of good elasticity and good mechanical strength.

Due to its special construction, this cable can be particularly easily bent and is stable in its bent shape. It therefore can be used excellently for the manufacture of a prefabricated winding for linear motors. Its good flexibility is obtained, on the one hand, by the development of the conductor as stranded conductor with a plurality of individual wires which are stranded together. On the other hand, the flexibility and stability in bent shape are improved by the soft annealing of the stranded conductor. The cable can thus be bent without damage around particularly small radii which may, for instance, be on the order of magnitude of 1.5 times the cable diameter. By the soft-annealing of the stranded conductor the result is furthermore obtained that after bending, the cable retains its bent shape practically unchanged, so that it can be particularly easily subjected to further operations in its meander shape. Flexibility and dimensional stability can be further improved in the manner that the stranded conductor is compacted before the soft annealing, namely, preferably, to about 90%.

The extruded inner conductive layer is very firmly attached to the stranded conductor by the filling up of the outer empty spaces. This firm seat is beneficial in that the two conductive layers, together with the insulation, are so firmly seated on the stranded conductor that displacement of these layers is impossible upon the mounting of fittings. As compared with known constructions comprising a taping of the conductor, the flexibility of the cable is also improved by this development, so that the advantageous construction of the conductor is not impaired in this respect.

The sheathing, which consists of a special material, has a particularly high conductivity, so that good shielding is obtained in cooperation with the outer conductive layer. In addition to these good electrical properties, the sheathing, however, is also very flexible, which is important for the good flexibility of the cable. It furthermore has a high mechanical strength which is indispensable for the use of the cable in a prefabricated winding for linear motors. The cable must namely be held together in the coil with two other phase windings by mechanical fastening elements and it must also withstand its introduction into the grooves of the inductor without damage.

Further according to the invention, the direction of lay of the individual wires (6) of the stranded conductor (5) differs in the individual layers.

Still further, the stranded conductor (5) is compacted during the course of the stranding.

The stranded conductor (5) can be compacted to about 90%.

Also, the length of lay in the cover layer of the stranded conductor (5) corresponds to the equation $$s = k \cdot n \cdot d$$

where:
  $s$ = length of lay
  $n$ = number of individual wires in the cover layer
  $d$ = diameter of the individual wires in the cover layer constant $k = 3.0$ to $3.5$.

Moreover, the longitudinal conductivity of the outer conductive layer (9) is greater than that of the sheathing (10).

According to another feature, material having a base of EPDM to which highly active conductive carbon black are added is used for the inner conductive layer (7).

Still further, a material having a base of ethylene acetate copolymers to which highly conductive soots have been added is used for the sheathing (10).

With the above and other objects and advantages in view, the present invention will become more clearly understood in connection with the detailed description of a preferred embodiment, when considered with the accompanying drawings, of which:

FIG. 1 is a view of a cable in accordance with the invention, bent into a meander-shaped phase winding; and FIG. 2 is a perspective view of the cable itself with layers of its structure visible in sections.

DETAILED DESCRIPTION OF THE PREFERRED EMBODIMENT

Figure 2:
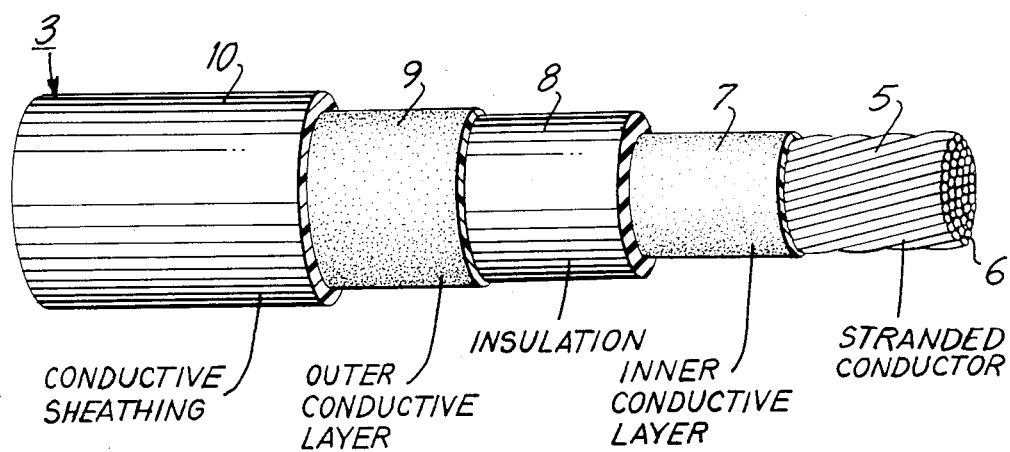

The drawing shows the inductor 1 of a linear motor which, together with a three-phase winding, represents the stator of the motor. The inductor 1 consists of laminations within which grooves 2 are provided to receive the phase windings. The stator is stretched out lengthwise. It may be many miles long. The phase windings consist in the present case of electric cables whose more precise construction will be explained with reference to FIG. 2.

Figure 1:
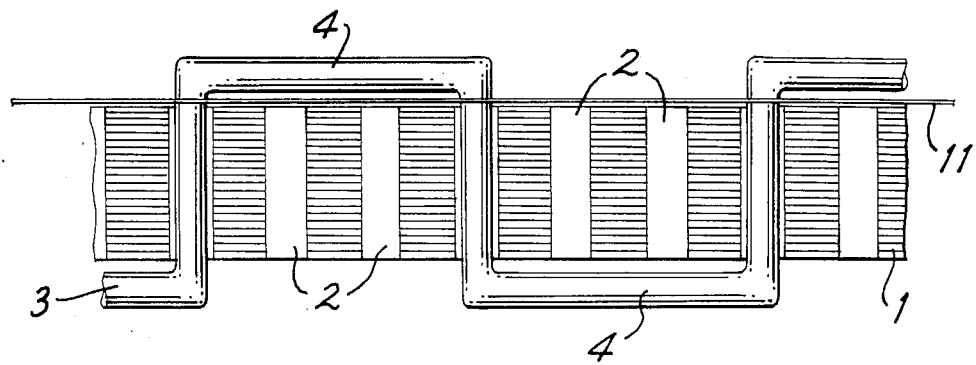

FIG. 1 shows a cable 3 which is fixed in meander shape in the grooves 2 of the inductor 1. The cable 3 is firmly attached during the course of its prefabrication to two other identical cables so as to form a three-phase winding. The unoccupied grooves 2 of the inductor 1 are provided to receive the other two cables, which have not been shown for the sake of simplicity. For the connecting of the three meander-shaped cables mechanical fastening elements which act on the cables are used. Such fastening elements are known, in principle, from Federal Republic of Germany OS No. 33 09 051. As a result of the special construction of the cable 3, it can be particularly easily deformed into meander shape, it retaining its shape, without additional expense, also in those regions 4 (end windings) which lie outside the inductor 1. On at least one side of the inductor 1 there can extend, over the entire length of the winding, a metallic strand 11 which is in good electrical contact with the phase windings and an be connected to ground potential. Such an arrangement is known, for instance, from Federal Republic of Germany Pat. No. 30 06 382.

The cable 3 has, for instance, the following construction:

The conductor of the cable 3 is developed as stranded conductor 5 which is formed of a plurality of individual wires 6. At least two layers of individual wires are present. The direction of lay of the stranding in these two layers should preferably be opposite to each other. In the event that more than two layers are present, the layers should alternately have an opposite direction of lay. The stranded conductor 5 may consist of aluminum wires. However, copper wires or wires of an aluminum-copper combination could also be used.

In the cover layer of the stranded conductor 5, which has the greatest length of stranding lay, said length is calculated preferably in accordance with the equation $$s = k \cdot n \cdot d$$

where:
s = length of lay
n = number of individual wires in the cover layer
d = diameter of the individual wires in the cover layer
constant k = 3.0 to 3.5.

Example of the Construction of the Stranded Conductor

The stranded conductor 5 is formed, for instance, of aluminum wires of a diameter of d = 2.6 mm. It should consist of five layers of individual wires, with 22 wires in the cover layer. With the value k = 3.5 there is obtained a length of lay s of about 200 mm in the cover layer. The stranded conductor 5 is compacted upon its manufacture, preferably to about 90%. The stranded conductor 5 is then soft-annealed. As a result, it can easily be bent even around very small radii, down to an order of magnitude of 1.5 times the cable diameter. After the bending it springs back only insignificantly, so that it retains its bent shape in relatively stable manner.

An inner conductive layer 7 is extruded onto the stranded conductor 5. The extrusion is so effected that the material of the conductive layer 7 penetrates also into the outer spaces which are present between the individual wires 6 of the outer layer of the stranded conductor 5. The conductive layer 7 is thereby firmly attached to the stranded conductor 5 since it anchors itself on it. This firm seat is so good that the conductive layer 7 is not detached from the stranded conductor 5 either by bending or by axial stressing. For the inner conductive layer 7, a material having a base of EPDM (ethylene-propylene-diene mononer rubber) can preferably be employed. This is a material having a base of a copolymer of ethylene and propylene. Highly active conductive carbon black are added to the base material, namely a conductive carbon black by itself or else several of them mixed.

Example of a Mixture for the Inner Conductive Layer 80 to 130 parts of conductive soot are added to 100 parts of base polymer. Furthermore, 30 to 70 parts of plasticizer, up to 10 parts of lubricant, 2 parts of crosslinking linking agent and 1 part of stabilizer against thermal aging are added.

In the same operation as the application of the inner conductive layer 7, the insulation 8 is applied over it, also by extrusion. The insulation 8 consists, for instance, of a mixture having a base of EPR (ethylene-propylene copolymer rubber). The outer conductive layer 9, for which the same materials can be used as for the inner conductive layer 7, is extruded on the insulation 8 also in the same operation. By the anchoring of the inner conductive layer 7 on the stranded conductor 5, such a firm seat is obtained for the three layers 7, 8 and 9 as a whole that these layers are immovable even upon the mountings of fittings. This is true, in particular, also upon the use of fittings which are pushed on and upon the application of which said layers are subjected to axial stressing.

The sheathing 10 is applied over the outer conductive layer 9 also by extrusion. In addition to providing mechanical protection for the cable 3 it also forms, in combination with the outer conductive layer 9, the electrical shield for the cable. Polymers having a base of ethylene acetate copolymers which have, for instance, an acetate content of 30 to 70% are suitable, for example, as materials for the sheathing 10. A combination of highly conductive carbon black is added to these polymers.

Example 50 to 60 parts of highly conductive carbon black are added to 100 parts of base polymer. Furthermore, 0 to 10 parts of plasticizer, 2 parts of cross-linking agent and 0.8 parts of stabilizer against thermal aging are added.

The longitudinal conductivity of the outer conductive layer 9 is greater than that of the sheathing 10. With proper dimensioning the conductance for the outer conductive layer 9 is, for example, 1 to 10 mS×m and for the sheathing 10 it is 0.01 to 0.05 mS×m (wherein the term mS represents milliSiemens which are millimhos per meter, and m is the length of the cable in meters). In this way, assurance is had that charge currents flow preferably to the grounded metal strand 11. They can then not pass from one phase to others at the points of contact of the cable in the regions 4. In this way, "scorch spots" are avoided.

We claim:

1. In an electric cable for use as a phase winding in a three-phase alternating-current winding for linear motors in which the phase windings are fixed in a meander-like course in the grooves of an elongated inductor, the cable comprising a metallic conductor, an inner conductive layer surrounding the conductor, a layer of insulation disposed over said conductive layer, an outer conductive layer surrounding said insulation and a sheathing of electrically conductive material disposed over said outer conductive layer, the improvement wherein
    said conductor is a stranded conductor having at least two layers of individual wires, and the direction of lay of the individual wires of the stranded conductor differs between successive ones of said layer of wires;
    said conductor is compacted in its entirety to about 90% of its original size during and annealed after a stranding operation to provide for substantially inelastic bending of the conductor;
    said inner conductive layer is formed on said stranded conductor by extrusion, fills up outer interstices between individual wires of an outer layer of the stranded conductor, and is firmly attached to said insulation surrounding the inner conductive layer;
    said outer conductive layer comprises a highly conductive flexible material which is firmly attached to said insulation; and
    the sheathing is of high electric conductivity and comprises a material of sufficient elasticity and sufficient mechanical strength to allow emplacement of the cable in grooves to be filled in said inductor, with substantially inelastic bending of the cable causing the cable to substantially retain the physical configuration of the grooves.

2. The cable according to claim 1, wherein
    in said stranded conductor, one layer of wires is a cover layer which covers an inner layer of wires; and
    the length of lay in a cover layer of the stranded conductor corresponds to the equation $$s = k \cdot n \cdot d$$

where:
    s=length of lay;
    n=number of individual wires in the cover layer;
    d=diameter of the individual wires in the cover layer; and constant k=3.0 to 3.5.

3. The cable according to claim 1, wherein
    the longitudinal conductivity of said outer conductive layer is greater than that of said sheathing.

4. The cable according to claim 1, wherein
    the inner conductive layer comprises material having a base of EPDM to which highly active conductive carbon black are added.

5. In an electric cable for use as a phase winding in a three-phase alternating-current winding for linear motors in which the phase windings are fixed in a meander-like course in the grooves of an elongated inductor, the cable comprising a metallic conductor, an inner conductive layer surrounding the conductor, a layer of insulation disposed over said conductive layer, an outer conductive layer surrounding said insulation and a sheathing of electrically conductive material disposed over said outer conductive layer, the improvement wherein
    said conductor comprises a soft-annealed stranded conductor having at least two layers of individual wires;
    said inner conductive layer comprises an extrusion formed on said stranded conductor, which extrusion fills up outer interstices between individual wires of an outer layer of the stranded conductor and is firmly attached to said insulation;
    said outer conductive layer comprises a highly conductive flexible material which is firmly attached to said insulation; and
    the sheathing is of high electric conductivity and comprises a material of sufficient elasticity and sufficient mechanical strength to allow emplacement of the cable in grooves to be filled;
    the sheathing comprises a material having a base of ethylene acetate copolymers to which highly conductive carbon black are added.

6. A method of manufacturing an electric cable for use as a phase winding in a three-phase alternating-current winding for linear motors in which the phase windings are fixed in a meander-like course in the grooves of an elongated inductor, the cable comprising a metallic conductor, an inner conductive layer surrounding the conductor, a layer of insulation disposed over said conductive layer, an outer conductive layer surrounding said insulation and a sheathing of electrically conductive material disposed over said outer conductive layer, wherein
    said conductor comprises a stranded conductor having at least two layers of individual wires, wherein one of said layers of wires in an innermost layer of wires and another of said layers of wires is an outermost layer of wires;
    said inner conductive layer is formed as an extrusion on said stranded conductor, said extrusion filling up outer spaces between individual wires of said outermost layer of the stranded conductor and is firmly attached to said insulation;
    said outer conductive layer comprises a highly conductive flexible material which is firmly attached to said insulation; and
    the sheathing is of high electric conductivity and comprises a material of sufficient elasticity and sufficient mechanical strength to allow emplacement of the cable in grooves of said inductor;
    the method comprising the steps of
    stranding the conductor to provide a stranded conductor, the direction of lay of the individual wires of the stranded conductor differs between successive ones of said layers of wires;
compacting the stranded conductor in its entirety;
soft-annealing the stranded conductor after the stranding of the conductor; and
extruding said inner conductive layer on said stranded conductor followed by a forming of said insulation layer, said outer layer and said sheathing to provide for substantially inelastic bending of said cable.

* * * * *